(No Model.) 2 Sheets—Sheet 1.
H. B. MORRIS.
MACHINE FOR SCARFING ENDS OF CANE STRIPS FOR SPLICING.
No. 517,876. Patented Apr. 10, 1894.
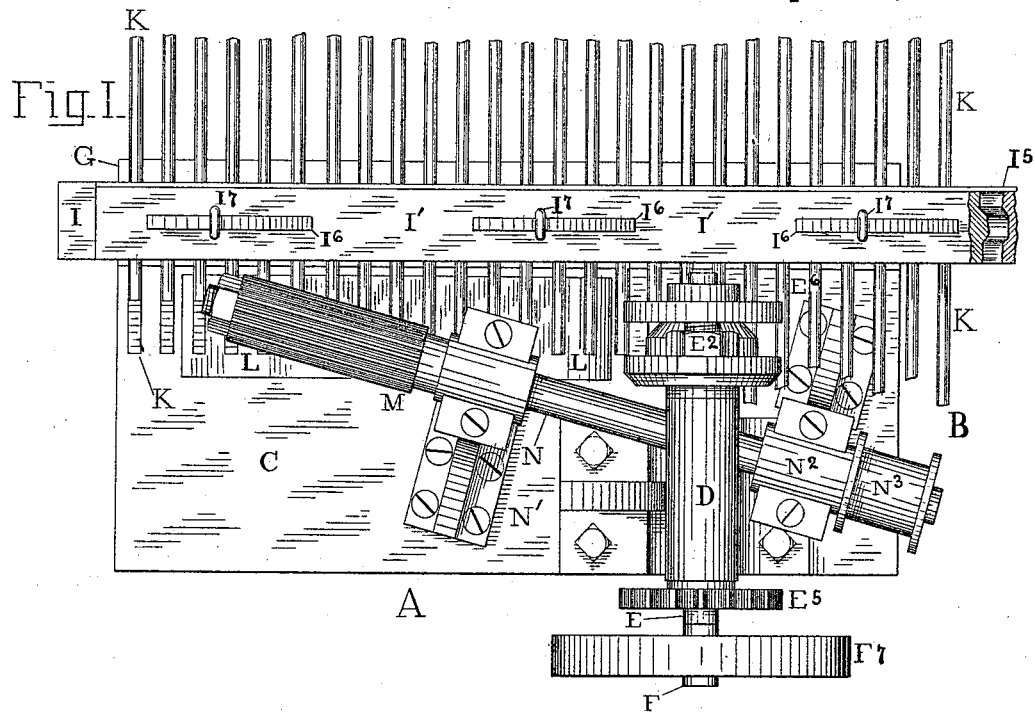
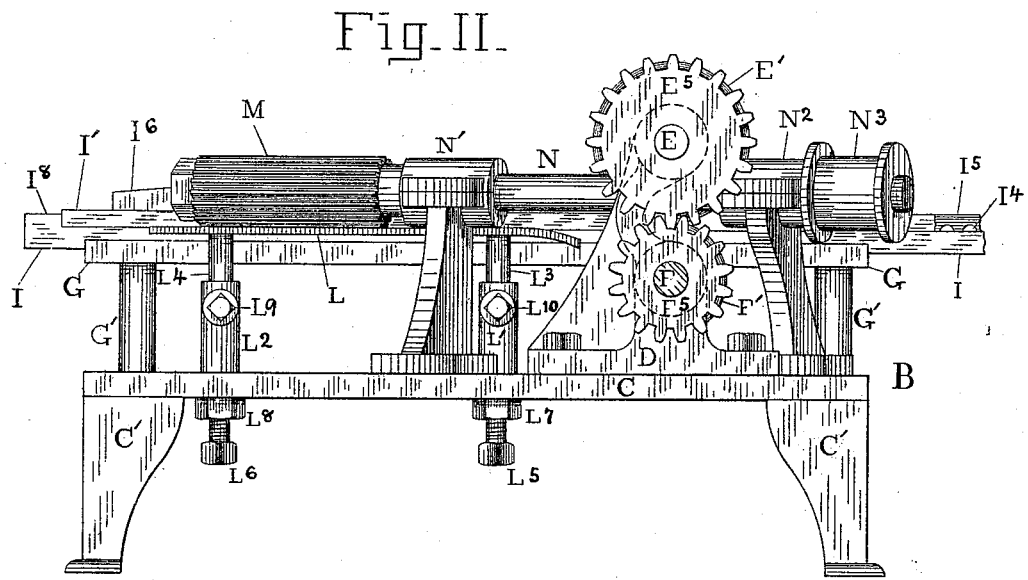
WITNESSES
E. W. Young
C. H. Purdy
INVENTOR
Henry B. Morris.
THE NATIONAL LITHOGRAPHING COMPANY,
WASHINGTON, D. C.

(No Model.)  2 Sheets—Sheet 2.
H. B. MORRIS.
MACHINE FOR SCARFING ENDS OF CANE STRIPS FOR SPLICING.
No. 517,876. Patented Apr. 10, 1894.
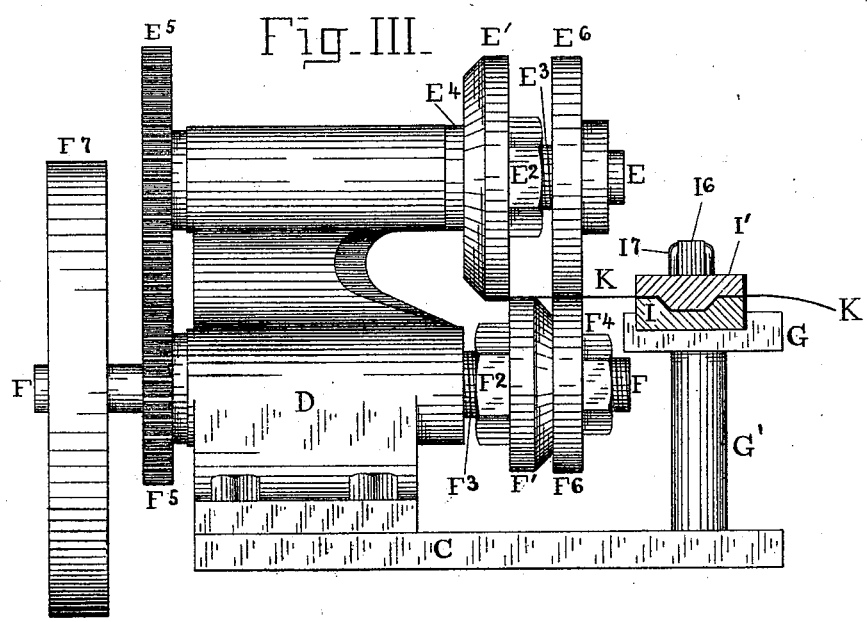
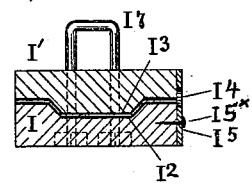
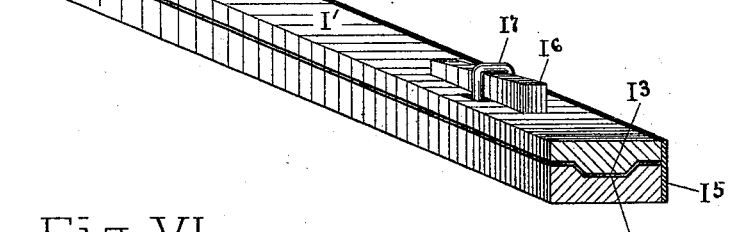
WITNESSES
E. W. Young
C. H. Purdy
INVENTOR
Henry B. Morris.

UNITED STATES PATENT OFFICE.

HENRY B. MORRIS, OF MICHIGAN CITY, INDIANA, ASSIGNOR TO FORD, JOHNSON & CO., OF SAME PLACE.

MACHINE FOR SCARFING ENDS OF CANE STRIPS FOR SPLICING.

SPECIFICATION forming part of Letters Patent No. 517,876, dated April 10, 1894.

Application filed May 22, 1893. Serial No. 475,076. (No model.)

*To all whom it may concern:*

Be it known that I, HENRY B. MORRIS, a citizen of the United States, residing at Michigan City, in the county of La Porte and State of Indiana, have invented certain new and useful Improvements in Machines for Scarfing the Ends of Cane Strips for Splicing, of which the following is a specification.

My invention relates to that class of machines employed for scarfing the ends of pieces of split cane, preparatory to gluing or otherwise joining said ends, to make a continuous strip, for well known uses in the arts.

The general object of my invention is to provide means for automatically scarfing these ends cheaply, rapidly and accurately; which ends I attain by clamping a large number of the strips, near the middle, side by side and parallel to each other, at regulated distances apart, in the line of the feed, and transversely to the line of travel of a clamp, which first carries them under shears which cut their ends of uniform length, and then under cutters which scarf the ends, which cutters act longitudinally on the strips from the outer edge inward, to avoid tearing or twisting the strips.

The first part of my invention relates to the clamp which holds and feeds the cane-strips, while being fed through the machine. Its objects are to clamp the strip securely in the desired relation; to feed them through the machine with the clamp in a fixed path, and to enable them to be removed with the clamp from the machine for further manipulation, as hereinafter explained. These ends I attain by constructing the clamp of interlocking tongued and grooved sections, provided on one edge with a gage-plate for regulating the distance apart of the strips; with studs or projections which prevent the longitudinal movement of the sections relatively to each other, and with locking devices, which securely fasten the sections and interposed strips together. A series of such clamps is constructed to traverse a race-way arranged in suitable relation to the cutters, as hereinafter set forth.

The next part of my invention relates to the mechanism for cutting the ends of the strips of uniform lengths. Its objects are to cut the strips without tearing or twisting them; to hold them securely while being so cut, and to compensate the wear of the cutters. These ends I attain by mounting rotary shears one above the other, with their cutting edges slightly overlapping, upon shafts mounted in an overhanging or recessed frame. These shears are rendered adjustable collars or jam-nuts screwed upon the shafts. Feed-rolls mounted upon an extension of these shafts grasp the cane close to the shears at the moment of cutting off the ends of the strips, and prevent them from springing out of the way.

The next part of my invention relates to the means for scarfing the ends of the strips. Its objects are to support their ends properly while being scarfed, and to enable the scarfing to be done from the edge inward, longitudinally of the strip, and to vary the amount of scarfing as required. These ends I attain by mounting a scarfing-cutter substantially in the plane of the feed, on an axis oblique to and intersecting the plane of the rotary shears and feed-rolls, so that the same cutter successively cuts farther from the end of the strip, as it is fed along. The strips while being cut are supported upon a plate adjustable to and from the scarfing-cutter, to vary the thickness of cut, as hereinafter explained.

The subject-matter herein claimed consists of certain novel combinations, constructions, and organizations of these and other instrumentalities hereinafter specified.

The accompanying drawings show all my improvements as embodied in one machine, in the best way now known to me, but illustrate so much only of the apparatus as is necessary to a clear conception of the subject-matter claimed.

Figure 1 represents a plan or top view thereof, and Fig. 2, a front elevation, with the driving-pulley removed, more clearly to show the working parts. Fig. 3 is an elevation, on an enlarged scale, of the right-hand or feed-end of the machine, with the scarfing-shaft removed. Fig. 4 is a perspective view, partly in section, of the clamp on an enlarged scale, and Fig. 5, an enlarged cross section therethrough, and Fig. 6 shows the scarfed ends of two strips ready for joining.

That side of the machine carrying the gearing and marked A I term the front; the opposite or clamp-side of the machine, the rear. The feed-end of the machine marked B, I term the right, and the discharge-end the left side of the machine. Unless otherwise indicated, the parts are of usual approved construction.

The mechanism is shown as mounted upon a frame or horizontal bed-plate C, supported on legs C'. A standard D, which I call the shear-standard, is erected upon the bed-plate near its front right-hand corner. Two parallel horizontal shafts E, F, are journaled in this standard transversely to the bed-plate, one directly over the other. The back of the shear-standard is recessed or overhung as shown in Fig. 3, to permit of the passage of the scarfing cutter-shaft obliquely therethrough, as hereinafter explained.

The inwardly-projecting end of the shaft E, carries a circular shear E'. This projecting end is screw-threaded, and carries a jam-nut $E^2$, which compresses the shear against a collar $E^4$, on the shaft next the shear-standard, thus causing the shear to revolve positively with the shaft. A corresponding shear F', is similarly secured upon the lower shaft F, the arrangement being somewhat different, however. A jam-nut $F^2$, is screwed upon the shaft, between the shear-standard and cutter, in addition to the outer jam-nut $F^4$. The shears E', F', it will be observed, revolve close together, with their adjacent cutting-edges slightly overlapping each other, and the jam-nuts permit of adjustment along the shaft to compensate wear and maintain them in proper relation to each other. These shears are driven at uniform speed and in proper relation to each other by gears $E^5$, $F^5$, on the outer ends of their respective shafts, end-motion in which is prevented by suitable collars on the gears and shafts. Feed-rollers $E^6$, $F^6$, are mounted upon the shafts E and F, respectively, with their peripheries nearly touching, and being likewise of substantially the same diameter as the cutters. The object of this construction is to prevent the cane-strips from being deflected out of the way when passing between the shears, instead of being cut by them, the cane-strips being held by the feed-rolls in or near the cutting line, and thus prevented from slipping backward upon the cutting edges of the shears. The peripheries of these feed-rollers are preferably covered with leather, rubber or other elastic substance, to enable them more securely to grasp the cane-strips passing between them. The shear-shafts are driven by means of a driving-pulley $F^7$, on its front end, deriving its motion from any suitable prime-mover.

The above-mentioned recessing or overhanging of the shear-shafts leaves an open space in front of the contact point of the shears, so that the projecting ends of the cane-strips may encounter no obstruction in their passage therethrough.

A supporting-plate L, or scarfing table, is mounted adjustably upon the bed-plate in the following manner: Two tubular standards, L', $L^2$, on the bed-plate, receive supporting-stems $L^3$, $L^4$ extending below the plate. The lower ends of these stems rest upon set-screws working endwise in the tubular standards, and are held at the desired adjustment therein by jam-nuts $L^7$, $L^8$, underneath the bed-plate; set-screws $L^9$, $L^{10}$, passing laterally through the tubular standards, may likewise be employed to effect the same result. As under this organization either end of the scarfing-plate may be adjusted independently of the other, both the thickness of the finished ends of the cane-strips, and the amount of their taper may easily be regulated. The end of the plate nearest the shears is bent slightly downward to prevent the cane-strips from passing below it.

A cylindrical scarfing cutter M, is shown as mounted on a shaft N, journaled in standards N', $N^2$, on the bed-plate, and carrying a pulley on its forward end for driving it. This scarfing cutter, it will be observed, overlies the scarfing plate, obliquely to the line of feed, and to the vertical plane of the rotary shears, its shaft passing through the recess in the shear-standard hereinbefore mentioned; the purpose of which organization will be hereinafter more fully explained.

A flanged or trough-shaped plate G, preferably of metal, which I term a clamp-race, mounted on standards G', on the bed-plate, extends longitudinally along the back of the machine, parallel with the plane of the shears or feed-line.

A clamp, preferably of wood, is shown as composed of two sections I, I'; the lower board or section I, is adapted to fit loosely and slide freely longitudinally in the clamp-race. A shallow longitudinal groove $I^2$, in the upper side of the lower board, receives a corresponding tongue $I^3$, on the lower side of the upper board, thus causing the cane-strips when laid transversely therein, to be bent out of a right-line and held firmly, so that they cannot be drawn endwise through the clamp when acted upon by the scarfing cutter. The clamping surfaces of these boards are preferably faced with rubber, leather or other elastic substance to hold the cane-strips more firmly, without danger of crushing them. A plate $I^5$, secured by fastening devices $I^{5\times}$ to the edge of one of the boards is provided with holes or recesses to regulate the distance between the cane-strips. Staples fixed in the lower board project through openings in the upper board. Wedges $I^6$, driven through these staples lock the sections firmly together. Projections $I^8$, on each end of the lower board, prevent the upper board from moving longitudinally relatively thereto. To fill the clamp, the upper board is removed, and the cane-strips laid transversely across the lower board, in the holes or recesses $I^4$, close together and parallel with each other, (see Fig. 1.) The front ends of the strips project far enough in front of the clamp to pass under the shears. The opposite ends of the strips may project to any extent necessary, there being no obstruction on that side of the machine. The strips being properly arranged, the upper board is replaced, and the wedges driven into the staples, thus clamping the strips securely in place.

K, Fig. 1, indicates the relation of the strips when held in the clamp.

The above described clamp may be of convenient length for holding the desired number of strips to be scarfed at one time, and as these clamps are adapted to be readily inserted in, slid along, and removed from the clamp-race, any desired number of such clamps may be used, being filled with cane-strips by assistants, while the prepared clamps are being passed through the machine by the operator. In preparing such strips for splicing, it is common to bunch the ends of the strips together, after being scarfed, to dip them into melted glue or other cement, and to allow the glue to dry thereon; softening the glue again by the application of steam or otherwise, just before joining two ends together. My improved clamp enables me to dip the scarfed ends of all the strips confined therein at once into a suitable tank of glue or cement, afterward drying them before removal from the clamp. The strips being thus held apart, are prevented from adhering to one another, as often happens when they are dipped and dried in a bunch, in the usual way.

The following is a description of the operation of the machine: The clamp supplied with cane-strips as hereinbefore described, is inserted in the right-hand end of the clamp-face, and slid along therein by the operator from right to left. This carries the ends of the cane-strips projecting on the front side of the clamp underneath the cutters. The recess in the shear-standard hereinbefore mentioned leaves an unobstructed space in which the projecting ends of the cane-strips can travel. Each strip, just at the moment of being cut off by the shears, is grasped between the feed-rolls $E^6$, $F^6$, and securely held. By reference to Fig. 2, it will be observed that the strip at this moment is not only grasped by the clamp and by the feed-rolls, but is also supported by the lower shear, thus effectually preventing any deflection, slipping or twisting of the strips while being trimmed. These trimmed strips then pass between the scarfing-plate L, and the scarfing cutter, which latter, owing to its oblique arrangement to the line of feed, acts first upon the extreme outer or front end of the strip, gradually cutting inward as the feed progresses, until the desired scarfing has been effected, by which means the strain of the scarfing cutter acts lengthwise of the strip, and the portion first scarfed is not subjected to strain resulting from the progressive cutting of the remaining portion.

I regard this as a new and important improvement over the method of scarfing previously employed, in which the scarfing tool began its work at a distance from the end of the strip, and cut toward it, the depth of cut constantly increasing, until the surplus portion at the end of the strip is finally cut or torn off. This practice produces a very irregular product, as the surplus ends are torn off at different points, thereby forming scarfs of very uneven lengths, requiring their subsequent trimming to a proper length by hand before being joined together.

Having thus fully described the construction, organization, and operation of my improved machine for scarfing cane strips, what I claim therein as new and as of my own invention is—

1. The hereinbefore described cane-strip clamp, comprising in its organization, a longitudinally-grooved section; a corresponding, interlocking tongued section; a guide-plate attached to one section; holes or recesses therein through which the cane-strips are inserted transversely to the clamp, and means, substantially such as described, for locking the clamp-sections and compressing the cane-strips, whereby the cane-strips are held centrally, at regulated distances apart, and moved bodily with the clamp.

2. The hereinbefore described cane-strip clamp, comprising in its organization, corresponding longitudinally-grooved and tongued sections; a guide-plate attached to one section; holes or recesses therein through which the cane-strips are inserted transversely to the clamp; projections on one section to prevent longitudinal motion of one section relatively to the other, and means, substantially such as described, for locking the clamp-sections and compressing the cane-strips, for the purposes described.

3. The combination, substantially as hereinbefore set forth, of a scarfing-cutter extending obliquely inward in the direction of the movement of the cane-strips, and gearing for driving it in the proper direction to scarf the strip progressively from its edge inward, as specified.

4. The combination, substantially as hereinbefore set forth, of a traversing feed-clamp; a strip-supporting plate, and a scarfing-cutter mounted on an axis oblique to the line of motion of the feed-clamp, and inclined inwardly in the direction of the movement of the clamp; whereby the strip is scarfed from its end inward, as specified.

5. The combination, substantially as hereinbefore set forth, of a traversing feed-clamp; shears for trimming the ends of the cane-strips; a scarfing-cutter mounted on a shaft oblique to the line of movement of the feed-clamp, and inclined inwardly in the direction of its movement, and gearing for driving the shears and cutters in the proper direction, as and for the purposes specified.

6. The combination, substantially as hereinbefore set forth, of a traversing feed-clamp;

shears for trimming the ends of the cane-strips; feed-rolls intermediate of the clamp and shears, and a scarfing-cutter mounted on a shaft oblique to the line of movement of the clamp, and inclined inwardly in the direction of this movement, and gearing for driving the shears, rolls and cutter in the proper direction, as and for the purposes specified.

7. The combination, substantially as hereinbefore set forth, of a traversing feed clamp in which the strips to be trimmed are mounted, and by which they are carried at suitable distances apart, rotary shears for trimming the ends of the strips, shafts on which the shears are secured and which are supported in bearings at one end, and which have their opposite ends free or unsupported, pressure rollers interposed between the feed clamp and the shears and mounted on the unsupported or free ends of the shafts, whereby the strips are positively held as they pass crosswise through the shears and are prevented from springing or yielding, and devices for further trimming the strips after they have passed through the shears.

HENRY B. MORRIS.

Witnesses:
WILL. C. FARGHER,
C. H. PURDY.